(12) United States Patent
Engelhart et al.

(10) Patent No.: US 12,553,137 B2
(45) Date of Patent: Feb. 17, 2026

(54) COATED CUTTING TOOL

(71) Applicant: WALTER AG, Tubingen (DE)

(72) Inventors: Wolfgang Engelhart, Tubingen (DE); Veit Schier, Tubingen (DE); Sven Majchrzak, Tubingen (DE)

(73) Assignee: Walter AG, Tubingen (DE)

( * ) Notice: Subject to any disclaimer, the term of this patent is extended or adjusted under 35 U.S.C. 154(b) by 506 days.

(21) Appl. No.: 17/785,594

(22) PCT Filed: Dec. 17, 2020

(86) PCT No.: PCT/EP2020/086659
§ 371 (c)(1),
(2) Date: Jun. 15, 2022

(87) PCT Pub. No.: WO2021/122905
PCT Pub. Date: Jun. 24, 2021

(65) Prior Publication Data
US 2023/0033516 A1 Feb. 2, 2023

(30) Foreign Application Priority Data

Dec. 19, 2019 (EP) ................................. 19218134

(51) Int. Cl.
| C23C 28/00 | (2006.01) |
| B23B 27/14 | (2006.01) |
| C23C 14/00 | (2006.01) |
| C23C 14/02 | (2006.01) |
| C23C 14/06 | (2006.01) |
| C23C 14/32 | (2006.01) |
| C23C 14/35 | (2006.01) |

(Continued)

(52) U.S. Cl.
CPC ............ *C23C 28/42* (2013.01); *B23B 27/148* (2013.01); *C23C 14/0036* (2013.01); *C23C 14/022* (2013.01); *C23C 14/024* (2013.01); *C23C 14/0641* (2013.01); *C23C 14/325* (2013.01); *C23C 14/35* (2013.01); *C23C 14/5886* (2013.01); *C23C 28/042* (2013.01); *C23C 28/044* (2013.01); *C23C 30/005* (2013.01); *B23B 2228/105* (2013.01)

(58) Field of Classification Search
None
See application file for complete search history.

(56) References Cited

U.S. PATENT DOCUMENTS

| 7,674,520 B2 | 3/2010 | Schier | |
| 2007/0059558 A1* | 3/2007 | Schier | C23C 30/005 |
| | | | 204/192.16 |

(Continued)

FOREIGN PATENT DOCUMENTS

| EP | 1762638 A2 | 3/2007 |
| WO | 9929921 A1 | 6/1999 |

(Continued)

*Primary Examiner* — Kim S. Horger
(74) *Attorney, Agent, or Firm* — Corinne R. Gorski

(57) ABSTRACT

A coated cutting tool and a process for the production thereof is provided. The coated cutting tool consists of a substrate body of WC—Co based cemented carbide and a coating, the coating including a first (Ti,Al)N multilayer, a first gamma-aluminium oxide layer, and a set of alternating second (Ti,Al)N multilayers and second gamma-aluminium oxide layers.

19 Claims, 1 Drawing Sheet

(51) Int. Cl.
*C23C 14/58* (2006.01)
*C23C 28/04* (2006.01)
*C23C 30/00* (2006.01)

(56) References Cited

U.S. PATENT DOCUMENTS

| | | |
|---|---|---|
| 2007/0059559 A1 | 3/2007 | Schier |
| 2010/0323176 A1* | 12/2010 | Van Den Berg ...... C23C 30/005 428/697 |
| 2011/0268514 A1* | 11/2011 | Schier ..................... C23C 28/40 407/119 |
| 2014/0193637 A1 | 7/2014 | Schier et al. |
| 2015/0211105 A1* | 7/2015 | Schier ................... C23C 28/042 428/141 |
| 2018/0223436 A1 | 8/2018 | Schier |
| 2018/0347027 A1* | 12/2018 | Kumar ................. B23B 27/148 |
| 2020/0255953 A1 | 8/2020 | Schier |

FOREIGN PATENT DOCUMENTS

| | | | |
|---|---|---|---|
| WO | WO-2018215408 A1 * | 11/2018 | ......... C23C 14/0617 |
| WO | 2019043167 A1 | 3/2019 | |

* cited by examiner

COATED CUTTING TOOL

RELATED APPLICATION DATA

This application is a § 371 National Stage Application of PCT International Application No. PCT/EP2020/086659 filed Dec. 17, 2020 claiming priority to EP 19218134.5 filed Dec. 19, 2019.

The present invention relates to a coated cutting tool comprising a substrate body of cemented carbide and a wear resistant coating applied to the substrate. The invention further relates to a process for the production of such a coated cutting tool.

BACKGROUND

Cutting tools for metal cutting, commonly consist of a substrate body made of cemented carbide having a wear-resistant coating of a combination of different layers deposited thereon by means of a CVD process (chemical vapor deposition) or a PVD process (physical vapor deposition). A cutting tool in this respect generally has a rake face, a flank face and a cutting edge there between. The shape and geometry of the cutting tool depends on the intended metal cutting operation. Examples of cutting tools are milling inserts, turning inserts, drills, and endmills.

There exist various different types of PVD processes resulting in different coating properties, such as for example cathode sputtering, cathodic vacuum arc evaporation, and ion plating. Cathode sputtering such as magnetron sputtering, reactive magnetron sputtering and high power impulse magnetron sputtering (HIPIMS) and the arc evaporation belong to the PVD processes most frequently used for the coating of cutting tools.

Different wear processes on the tool eventually deteriorates the performance of the tool and it has to be changed to a new one. Thus, when preparing a coated cutting tool for metal cutting, a major goal is that the tool should perform in service as long as possible, i.e., the tool life should be as long as possible. Also, high cutting speeds should be possible to use in the cutting operation. Since high cutting speeds generate a lot of heat this means that, for example, the heat resistance of the cutting tool, in particular the coating, should be high.

OBJECT OF THE INVENTION

It is an object of the present invention to provide a coated cutting tool which generally have high wear resistance giving long tool life in metal machining such as milling, turning and drilling, especially in milling of steel. The coated cutting tool of the invention should also allow for severe surface treatment without the coating being peeled off.

THE INVENTION

The present invention relates to a coated cutting tool consisting of a substrate body and a coating, wherein the substrate body being a WC—Co based cemented carbide body comprising 5-15 wt % Co, the coating comprises, in the order from the substrate surface, a first (Ti,Al)N multilayer being a multilayer of alternating (Ti,Al)N sub-layers, wherein
the overall atomic ratio of Ti:Al within the first (Ti,Al)N multilayer is from 33:67 to 67:33;
the total thickness of the first (Ti,Al)N multilayer is from 1 to 8 μm;
each of the individual (Ti,Al)N sub-layers within the first (Ti,Al)N multilayer has a thickness of from 1 to 25 nm;
each of the individual (Ti,Al)N sub-layers within the first (Ti,Al)N multilayer being different in respect of the atomic ratio Ti:Al than an immediately adjacent (Ti,Al)N sub-layer;
the first (Ti,Al)N multilayer comprises two or more (Ti,Al)N sub-layer stacks arranged immediately on top of each other, wherein within the same (Ti,Al)N sub-layer stack there exists at least two types of individual (Ti,Al)N sub-layers wherein the at least two types of individual (Ti,Al)N sub-layers have different Ti:Al atomic ratios, the overall Al content within each of the (Ti,Al)N sub-layer stacks increases from one (Ti,Al)N sub-layer stack to the next (Ti,Al)N sub-layer stack in the direction towards the outer surface of the coating;
a first gamma-aluminium oxide layer, wherein
the thickness of the first gamma-aluminium oxide layer is from 0.3 to 1.5 μm;
a set of alternating second (Ti,Al)N multilayers and second gamma-aluminium oxide layers, wherein
the number each of second (Ti,Al)N multilayers and second gamma-aluminium oxide layers (10) is ≥2;
each of the second (Ti,Al)N multilayers being a multilayer of alternating (Ti,Al)N sub-layers,
the overall atomic ratio of Ti:Al within the second (Ti,Al)N multilayers is within the range from 33:67 to 67:33;
the thickness of each of the second (Ti,Al)N multilayers is from 0.05 to 0.5 μm;
each of the individual (Ti,Al)N sub-layers within the second (Ti,Al)N multilayers has a thickness within the range from 1 to 25 nm, preferably from 2 to 10 nm;
each of the individual (Ti,Al)N sub-layers within the second (Ti,Al)N multilayers being different in respect of the atomic ratio Ti:Al than an immediately adjacent (Ti,Al)N sub-layer;
the thickness of each of the second gamma-aluminium oxide layers is from 0.05 to 0.5 μm;
the total thickness of the whole coating of the coated cutting tool is from 3 to 15 μm.

In one embodiment, the surface zone of the substrate body exhibits a residual compressive stress of at least 0.5 GPa, preferably at least 0.8 GPa, most preferably from 1 to 2 GPa.

By the surface zone of the substrate body is herein meant the uppermost part of the substrate body and is a distance from the surface of the substrate body where the X-rays used in the residual stress measurement method penetrates.

Preferably, the increase in the overall Al content within each of the (Ti,Al)N sub-layer stacks from one (Ti,Al)N sub-layer stack to the next (Ti,Al)N sub-layer stack in the direction towards the outer surface of the coating of the first (Ti,Al)N multilayer includes that the atomic ratio Ti:Al over several pairs of adjacent (Ti,Al)N sub-layers remains constant over several pairs of adjacent (Ti,Al)N sub-layers of one sub-layer stack and then the atomic ratio Ti:Al is lowered by a significant amount in the next several pairs of adjacent (Ti,Al)N sub-layers of a further sub-layer stack.

Within the same (Ti,Al)N sub-layer stack of the first (Ti,Al)N layer there exists suitably from two to five, preferably from two to four, most preferably two, types of individual (Ti,Al)N sub-layers wherein the different types of individual (Ti,Al)N sub-layers have different Ti:Al atomic ratios.

The overall atomic ratio of Ti:Al within the first (Ti,Al)N multilayer is suitably from 33:67 to 50:50, preferably from 35:65 to 45:55.

When the individual (Ti,Al)N sub-layers of the first (Ti,Al)N multilayer are very thin there may not be a sharp boundary between two adjacent sub-layers of different Ti:Al ratio. Instead, there may be a gradual change in the Ti:Al ratio over the thickness of the (Ti,Al)N multilayer in a periodic manner. Due to this the Ti:Al ratio of a sub-layer is herein considered to be the Ti:Al ratio present in the middle of a sub-layer.

In one embodiment, the atomic ratio Ti:Al of the type of individual (Ti,Al)N sub-layers of the first (Ti,Al)N multilayer having a highest Al content of the types of individual (Ti,Al)N sub-layers is from 20:80 to 60:40, preferably from 25:75 to 50:50, most preferably from 30:70 to 40:60.

In one embodiment, the atomic ratio Ti:Al of the type of individual (Ti,Al)N sub-layers of the first (Ti,Al)N multilayer having a lowest Al content of the types of individual (Ti,Al)N sub-layers is from from 35:65 to 80:20, preferably from 40:60 to 65:35, most preferably from 45:55 to 55:45.

In one embodiment, within the same (Ti,Al)N sub-layer stack of the first (Ti,Al)N multilayer there exists from two to five, preferably from two to three, most preferably two, different types of individual (Ti,Al)N sub-layers, the (Ti,Al)N sub-layers of the same type having the same composition with respect to the Ti:Al atomic ratio, and wherein the different types of individual (Ti,Al)N sub-layers have different Ti:Al atomic ratios.

Suitably, each of the individual (Ti,Al)N sub-layers within the first (Ti,Al)N multilayers of alternating (Ti,Al)N sub-layers has a thickness of from 2 to 10 nm.

The total thickness of the first (Ti,Al)N multilayer is suitably from 2 to 7 µm. In one embodiment, especially suitable for milling applications the total thickness of the first (Ti,Al)N multilayer is from 2 to 5 µm. In another embodiment, especially suitable for turning applications the total thickness of the first (Ti,Al)N multilayer is from 5 to 7 µm.

In one embodiment, the thickness of each (Ti,Al)N sub-layer stack of the first (Ti,Al)N layer is from 0.5 to 5 µm, suitably 1 to 3.5 µm, preferably from 1 to 2.5 µm.

Suitably, the first (Ti,Al)N multilayer consists of from two to five, preferably two to three, most preferably two (Ti,Al)N sub-layer stacks, arranged immediately on top of each other.

In one embodiment, the first (Ti,Al)N multilayer has a Vickers hardness HV0.0015≥2800, preferably ≥3000. The upper limit of the Vickers hardness HV0.0015 is suitably at most 3500.

In one embodiment, the first (Ti,Al)N multilayer has a reduced Young's modulus >350 GPa, preferably >400 GPa, more preferably >420 GPa. The upper limit of the reduced Young's modulus is suitably at most 520 GPa.

In one embodiment of the present invention, the first (Ti,Al)N multilayer is deposited immediately to the substrate surface, i.e., the (Ti,Al)N multilayer is in direct contact and has an interface with the substrate surface.

In one embodiment, there is a residual compressive stress present within a portion of a thickness of at least 100 nm to at most 1 µm within the first (Ti,Al)N multilayer from the interface of the (Ti,Al)N multilayer arranged in the direction towards the substrate body being from 0.5 to 2 GPa, preferably from 0.8 to 1.5 GPa.

The residual stress of the first (Ti,Al)N multilayer is suitably measured by X-ray diffraction applying the $\sin^2\Psi$ method based on the (1 1 1) reflection. Since XRD always measures over a certain penetration depths into the layer material, it is not possible to measure the residual stress of the first (Ti,Al)N multilayer only at the very interface to the substrate or to a layer immediately underneath the (Ti,Al)N multilayer. Therefore, in the sense of the present invention, the residual stress is measured within a portion of a thickness of at least 100 nm to at most 1 µm, preferably to at most 750 nm, more preferably to at most 500 nm, most preferably to at most 250 nm, within the first (Ti,Al)N multilayer from the interface of the (Ti,Al)N multilayer arranged in the direction towards the substrate. The residual stress within the first 100 nm to at most 1 µm from the interface may be measured by removing coating material above the first (Ti,Al)N multilayer and then further remove coating material so the thickness of the (Ti,Al)N multilayer is reduced, care has to be taken to select and apply a method for the removal of material which does not significantly alter the residual stress within the remaining (Ti,Al)N multilayer material. A suitable method for the removal of deposited coating material may be polishing, however, gentle and slow polishing using a fine-grained polishing agent should be applied. Strong polishing using a coarse grained polishing agent will rather increase the compressive residual stress, as it is known in the art. Other suitable methods for the removal of deposited coating material are ion etching and laser ablation.

In one embodiment, the difference between the absolute amounts of the residual stresses of (i) the portion of a thickness of at least 100 nm to at most 1 µm within the first (Ti,Al)N multilayer from the interface of the (Ti,Al)N multilayer arranged in the direction towards the substrate body and of (ii) the surface zone of the substrate body is ≤400 MPa, preferably ≤200 MPa.

The difference in the overall Al content between the (Ti,Al)N sub-layer stacks, can be achieved in several ways, individually or in combination. For example, an increase of the Al content can be achieved by the selection of the types and number of targets containing certain amounts of Al and Ti during the progress of the deposition process. Further, the Al and Ti contents in the deposited coating layers can be varied by varying the deposition condition, such as bias and arc current.

Also, the increase of the Al content over the thickness of the first (Ti,Al)N multilayer can be achieved by an increase of the thicknesses of the individual (Ti,Al)N sub-layers having higher Al contents than the thicknesses of the individual (Ti,Al)N sub-layers having lower Al contents.

An increase of the Al content over the thickness of the first (Ti,Al)N multilayer may lead to different residual stresses between parts of the (Ti,Al)N multilayer. Also, the residual stress within the first (Ti,Al)N multilayer can be influenced by varying the deposition condition, such as bias and arc current.

Suitably, the thickness of the first gamma-aluminium oxide layer is from 0.4 to 1 µm, preferably from 0.5 to 0.8 µm.

The overall atomic ratio of Ti:Al within the second (Ti,Al)N multilayer is suitably from 33:67 to 50:50, preferably from 35:65 to 45:55.

Suitably, the thickness of each of the second (Ti,Al)N multilayers is from 0.1 to 0.4 µm;

In one embodiment the second (Ti,Al)N multilayer comprises from two to five, preferably from two to four, most preferably two, types of individual (Ti,Al)N sub-layers wherein the different types of individual (Ti,Al)N sub-layers have different Ti:Al atomic ratios.

Suitably, each of the individual (Ti,Al)N sub-layers within the second (Ti,Al)N multilayers of alternating (Ti,Al)N sub-layers has a thickness of from 2 to 10 nm.

When the individual (Ti,Al)N sub-layers of the second (Ti,Al)N multilayers are very thin there may not be a sharp boundary between two adjacent sub-layers of different Ti:Al ratio. Instead, there may be a gradual change in the Ti:Al ratio over the thickness of the (Ti,Al)N multilayer in a periodic manner. Due to this the Ti:Al ratio of a sub-layer is herein considered to be the Ti:Al ratio present in the middle of a sub-layer.

In one embodiment, the atomic ratio Ti:Al of the type of individual (Ti,Al)N sub-layers of the second (Ti,Al)N multilayer having a highest Al content of the types of individual (Ti,Al)N sub-layers is from 20:80 to 60:40, preferably from 25:75 to 50:50, most preferably from 30:70 to 40:60.

In one embodiment, the atomic ratio Ti:Al of the type of individual (Ti,Al)N sub-layers of the second (Ti,Al)N multilayer having a lowest Al content of the types of individual (Ti,Al)N sub-layers is from from 35:65 to 80:20, preferably from 40:60 to 65:35, most preferably from 45:55 to 55:45.

Preferably all second (Ti,Al)N multilayers are the same, i.e., they have substantially the same overall Ti:Al atomic ratio and Ti:Al atomic ratio of their sub-layers.

In one embodiment each of the second (Ti,Al)N multilayers has the same sub-layer alternation and sub-layer compositions as present in the outermost sub-layer stack of the (Ti,Al)N sub-layer stacks of the first (Ti,Al)N multilayer. The reasons for this are both practical and technical. there is an advantage in keeping the comparatively higher aluminium content of the outermost sub-layer stack of the first (Ti,Al)N multilayer since it has been shown that a higher aluminium content correlates to better wear resistance. Also, in case the aluminium content has been increased in the first (Ti,Al)N layer by adding a further target of the higher aluminium content in the PVD chamber then the deposition rate increases which is an advantage.

The number each of second (Ti,Al)N multilayers and second gamma-aluminium oxide layers is suitably from 2 to 20, preferably from 2 to 10, most preferably from 2 to 6. When using a higher number, i.e., a higher number of repetitions, more toughness is introduced into the coating and it is also believed that a lower thermoconductivity is provided due to the increased number of grain boundaries. However, if the number is too high, the complexity in making the coating increases since one has to change the process a lot of times between producing a (Ti,Al)N multilayer and producing an aluminium oxide. It also increases the production time. Therefore, it is preferred to limit the number of repetitions so that a sufficient technical effect is provided at a reasonable complexity and production time.

Suitably, the thickness of each of the second gamma-aluminium oxide layers is from 0.1 to 0.3 μm.

In a preferred embodiment of the coated cutting tool of the present invention the alternating (Ti,Al)N sub-layers of the first and second (Ti,Al)N multilayers of the coating are deposited by cathodic arc evaporation.

In one embodiment, the Vickers hardness HV0.0015 of the first gamma-aluminium oxide layer, preferably both the first and second gamma-aluminium oxide layers, is from 3000 to 3500 HV0.0015.

In one embodiment, the reduced Young's modulus of the first gamma-aluminium oxide layer, preferably both the first and second gamma-aluminium oxide layers, is from 350 to 390 GPa.

In one embodiment, the coating comprises as an outermost layer a metal nitride layer, the metal belonging to group 4, 5, or 6, of the periodic table of elements, preferably Zr, Ti or Cr, the thickness being from 0.01 to 1 μm, preferably from 0.05 to 0.5 μm. The function of this outermost layer is one or more of wear indication, decor, and diffusion barrier to workpiece materials. Preferably, the outermost layer is a ZrN layer.

The total thickness of the whole coating of the coated cutting tool is suitably from 3 to 10 μm. The ideal thickness depends on the metal cutting application. In one embodiment, especially suitable for milling applications, the total thickness of the whole coating of the coated cutting tool is from 3.5 to 6 μm. In another embodiment, especially suitable for turning applications the total thickness of the whole coating of the coated cutting tool is from 6 to 8 μm. In another embodiment, especially suitable for drilling applications the total thickness of the whole coating of the coated cutting tool is from 3 to 5 μm.

The substrate of the coated cutting tool of the present invention is a WC—Co based cemented carbide comprising from 5 to 15 wt % Co. The substrate optionally comprises further cubic carbides or carbonitrides, as it is generally known in this field.

In one embodiment, the substrate is a cemented carbide with a composition, balancing 100 wt %, of from 86 to 90 wt % WC, from 0.2 to 0.8 wt % Cr and from 11 to 13 wt % Co. The WC grain size is <1 μm, preferably from 0.2 to 0.6 μm.

In one embodiment, the substrate is a cemented carbide with a composition, balancing 100 wt %, of from 86 to 90 wt % WC, from 0.5 to 2 wt % (Ta,Nb)C and from 8 to 13 wt % Co. The WC grain size is <1.5 μm, preferably from 0.5 to 1.2 μm.

The WC grain size is herein determined from the value of magnetic coercivity. The relationship between coercivity and grain size of WC is described, e.g., in Roebuck et al., Measurement Good Practice No. 20, National Physical Laboratory, ISSN 1368-6550, November 1999, Revised February 2009, Section 3.4.3, pages 19-20. For the purposes of this application the grain size of the WC, d, is determined according to formula (8) on page 20 in the above-mentioned literature:

$$K=(c_1+d_1 W_{Co})+(c_2+d_2 W_{Co})/d.$$

Re-arranging one gets:

$$d=(c_2+d_2 W_{Co})/(K-(c_1+d_1 W_{Co})),$$

wherein d=WC grain size of the cemented carbide body, K=coercivity of the cemented carbide body in kA/m, herein measured according to standard DIN IEC 60404-7, $W_{Co}$=wt % Co in the cemented carbide body, $c_1$=1.44, $c_2$=12.47, $d_1$=0.04, and $d_2$=−0.37.

The uppermost part of the substrate interfacing the coating suitably comprises substantially no damaged WC grains, i.e., WC grains cracked into smaller parts. This lack of damaged WC grains is a result from a specific pre-treatment ion etching procedure performed on the substrate prior to the deposition of the coating.

The coated cutting tool is suitably a cutting insert for milling, a cutting insert for turning, a cutting insert for drilling, a drill or an endmill, preferably a cutting insert for milling or a cutting insert for turning.

The present invention further includes a process for the production of a coated cutting tool consisting of a substrate body and a deposited coating, comprising the steps of:

providing a substrate body being a WC—Co based cemented carbide body comprising from 5 to 15 wt % Co;

subjecting the surface of the substrate body to a pre-treatment being an ion etching procedure so that at least 0.5 µm thickness of the substrate body is removed;

depositing a 1 to 8 µm thick layer of a first TiAlN multilayer by a cathodic arc evaporation PVD process using at least two TiAl targets different in Ti:Al atomic ratio in a chamber comprising nitrogen gas at a pressure of from 5 to 15 Pa, preferably from 7 to 12 Pa, using a bias voltage of from −20 to −80 V, preferably from −35 to −65 V, and at an applied arc current of from 50 to 200 A, preferably from 100 to 150 A, the (Ti,Al)N multilayer being a multilayer of alternating (Ti,Al)N sub-layers, the atomic Ti:Al ratio of the targets is chosen so that the overall atomic ratio of Ti:Al is from 33:67 to 67:33, each of the individual (Ti,Al)N sub-layers has a thickness within the range from 1 to 25 nm, each of the individual (Ti,Al)N sub-layers being different in respect of the atomic ratio Ti:Al than an immediately adjacent (Ti,Al)N sub-layer, the (Ti,Al)N multilayer is deposited in a manner so that it comprises two or more (Ti,Al)N sub-layer stacks arranged immediately on top of each other, wherein within the same (Ti,Al)N sub-layer stack there exists at least two types of individual (Ti,Al)N sub-layers wherein the at least two types of individual (Ti,Al)N sub-layers have different Ti:Al atomic ratios, the overall Al content within each of the (Ti,Al)N sub-layer stacks increases from one (Ti,Al)N sub-layer stack to the next (Ti,Al)N sub-layer stack in the direction towards the outer surface of the first (Ti,Al)N multilayer;

depositing a 0.3 to 1.5 µm thick layer of a first gamma-aluminium oxide layer by a reactive magnetron sputtering PVD process using at least one Al target in an oxygen containing gas volume at a total gas pressure of from 1 to 5 Pa, an oxygen partial pressure of from 0.001 to 0.1 Pa, at a temperature of from 400 to 600° C., using a power density at the magnetron of from 4 to 20 W/cm², a bias voltage of from 80 to 200 V and a pulsed bias current of from 20 to 60 A;

depositing a set of alternating layers of second (Ti,Al)N multilayers and second gamma-aluminium oxide layers, the second (Ti,Al)N multilayers and the second gamma-aluminium oxide layers are deposited using the same process conditions as when depositing the first (Ti,Al)N multilayer and the first gamma-aluminium oxide layer, respectively, the number each of second (Ti,Al)N multilayers and second gamma-aluminium oxide layers is ≥2, each of the second (Ti,Al)N multilayers being a multilayer of alternating (Ti,Al)N sub-layers, the overall atomic ratio of Ti:Al within the second (Ti,Al)N multilayers is from 33:67 to 67:33, the thickness of the second (Ti,Al)N multilayers is from 0.05 to 0.5 µm, each of the individual (Ti,Al)N sub-layers within the second (Ti,Al)N multilayers has a thickness of from 1 to 25 nm, each of the individual (Ti,Al)N sub-layers within the second (Ti,Al)N multilayers being different in respect of the atomic ratio Ti:Al than an immediately adjacent (Ti,Al)N sub-layer, the thickness of the second gamma-aluminium oxide layers is from 0.05 to 0.5 µm;

the total thickness of the whole deposited coating of the coated cutting tool is from 3 to 15 µm;

subjecting the deposited coating to a first post-treatment procedure comprising shot peening using beads of a zirconium oxide based ceramic so that a compressive stress of at least 0.5 GPa is induced in the surface zone of the substrate body;

subjecting the deposited coating to a second post-treatment procedure by wet blasting with a slurry of aluminium oxide particles.

In one embodiment, there is an outermost layer deposited after the depositing of the set of alternating layers of second (Ti,Al)N multilayers and second gamma-aluminium oxide layers, but prior to the first post-treatment procedure, the outermost layer being a metal nitride layer, the metal belonging to group 4, 5, or 6, of the periodic table of elements, preferably Zr, Ti or Cr.

In the deposition of the gamma-aluminium oxide layers the power density at the magnetron is suitably from 6 to 13 W/cm².

In the deposition of the gamma-aluminium oxide layers the pulsed bias voltage is suitably from 100 to 180 V. The pulsed bias voltage can be any one of unipolar or bipolar.

During earlier treatments of the cemented carbide body, such as edge rounding, blasting or grinding, made prior to the ion etching, there are commonly WC grains at the substrate surface that have been damaged. Such damaged WC grains are for example cracked into smaller parts which may form a point of the substrate surface where a deposited coating looses its attachment to the substrate resulting in flaking.

The pre-treatment by ion etching of the cemented carbide body prior to the deposition of the coating is made in order to reduce, or completely remove, WC grains that have been damaged, or mechanically fined, during earlier treatments of the cemented carbide body. In the ion etching suitably at least 0.8 µm thickness, preferably at least 1 µm thickness, most preferably at least 1.5 µm thickness, of the cemented carbide body is removed. These removal levels are at least seen within in an area close to the cutting edge, i.e., a distance of up to 500 µm from the cutting edge. The ion etching procedure preferably comprises removal of substantially all damaged WC grains from the cemented carbide body surface.

Furthermore, in addition to the removal of damaged grains, the ion etching procedure of the cemented carbide body reduces any amount of residual stress at the substrate surface that may have been induced by any earlier treatment since the uppermost part containing such induced residual stresses is in fact partly or completely removed. This will improve the coating adherence.

Preferably argon ion etching is the ion etching used. The ion etching process is performed for a sufficient time so that the desired removal of damaged grains is achieved.

By "shot peening" is herein meant a bombardment with a media comprising particles, so called beads, that are non-abrasive and typically have a round shape. The shot peening is herein a dry blasting process without any liquid used together with the beads. The beads are herein made of a zirconium oxide based ceramic. By zirconium oxide based is herein meant that the weight percent zirconium oxide in the beads exceeds 50 weight percent. The beads may further comprise other oxides such as silicon oxide and/or aluminium oxide.

The shot peening suitably induces a residual compressive stress of at least 0.5 GPa in the surface zone of the substrate body, preferably at least 0.8 GPa, most preferably from 1 to 2 GPa.

Suitably, the beads in the shot peening are within a size ranging from 50 to 175 µm, preferably from 70 to 125 µm. The impact or energy from the beads during the shot peening should not be too high since this would increase the risk of affecting the coating, and even result in flaking of the coating. The impact or energy from the beads should neither be too low since then the technical effect would not be achieved. If the beads are too large the risk of to much effect on the coating is increased. On the other hand, if the beads are too small the energy and impact transferred from the beads to the substrate is too small. A suitable size of the beads is to be selected by the skilled person.

The shot peening uses a blasting gun from which the beads exits a blasting nozzle. In one embodiment, the shot peening is performed using a blasting pressure of from from 1 to 8 bar, preferably from 3 to 6 bar. The blasting pressure is the exiting pressure from the nozzle.

In one embodiment, the working time in the shot peening is from 2 to 60 seconds, preferably from 2 to 10 seconds.

In one embodiment, the distance between the blasting nozzle and the surface of the coated cutting tool is from 50 to 200 mm, preferably from 75 to 150 mm.

In one embodiment the shot peening is performed in a shot direction having an angle to the surface of the coated cutting tool being from 75 to 90°, preferably substantially perpendicular, to the surface of the coated cutting tool.

In one embodiment, the beads in the shot peening are within a size ranging from 70 to 125 µm, the shot peening is performed using a blasting pressure of from 3 to 6 bar, the working time in the shot peening is from 2 to 10 seconds, the distance between the blasting nozzle and the surface of the coated cutting tool is from 75 to 150 mm, and the shot peening is performed in a shot direction substantially perpendicular to the surface of the coated cutting tool.

By "wet blasting" is herein meant a blasting process using a media comprising abrasive particles, herein aluminium oxide, in a liquid forming a slurry, wherein material typically is removed to some extent leading to a smoother surface of the coating. Also some residual compressive stresses are introduced into the coating.

In one embodiment, the wet blasting is done until a residual compressive stress of at least 0.2 GPa, preferably at least 0.5 GPa, most preferably at least 1 GPa, as averaged over the thickness of the coating, is induced within the coating.

The wet blasting uses a blasting gun from which the slurry exits a blasting nozzle. In one embodiment, the wet blasting is performed using a blasting pressure of from from 1.5 to 2 bar. The wet blasting pressure is the exiting pressure from the nozzle.

In one embodiment, the concentration of aluminium oxide particles in the slurry is from 15 to 20 vol-%.

For abrasive grains used in for example blasting there is a well-established standard—FEPA (Federation of European Producers of Abrasives)—defining the particle size. In one embodiment, the aluminium oxide particles used in the wet blasting belong to one or more of the FEPA designations F240, F280 and F320, preferably F280 and F320.

In one embodiment, the blasting time in the wet blasting is from 2 to 60 seconds, preferably from 2 to 30 seconds, most preferably from 2 to 10 seconds.

In one embodiment, the distance between the blasting gun nozzle and the surface of the coated cutting tool is from 50 to 200 mm, preferably from 75 to 150 mm.

In one embodiment the wet blasting is performed in a blasting direction having an angle to the surface of the coated cutting tool being from 60 to 90°, preferably from 75 to 90°.

In one embodiment, the second post-treatment procedure comprises wet blasting using a blasting pressure of from from 1.5 to 2 bar, the concentration of aluminium oxide particles in the slurry is from 15 to 20 vol-%, the aluminium oxide particles used in the wet blasting belong to one or more of the FEPA designations F240, F280 and F320, the blasting time in the wet blasting is from 2 to 60 seconds, the distance between the blasting gun nozzle and the surface of the coated cutting tool (1) is from 50 to 200 mm, and the wet blasting is performed in a blasting direction having an angle to the surface of the coated cutting tool being from 60 to 90°.

METHODS

XRD (X-ray Diffraction)

XRD measurements were done on a XRD3003 PTS diffractometer of GE Sensing and Inspection Technologies using CuKα-radiation. The X-ray tube was run in point focus at 40 kV and 40 mA. A parallel beam optic using a polycapillary collimating lens with a measuring aperture of fixed size was used on the primary side whereby the irradiated area of the sample was defined in such manner that a spill over of the X-ray beam over the coated face of the sample is avoided. On the secondary side a Soller slit with a divergence of 0.4° and a 25 µm thick Ni $K_\beta$ filter were used. The measurements were carried out over the range of 15 to 80° 2-theta with a step size of 0.03°. Grazing-incidence X-ray diffraction technique under 1° incidence angel was employed to study the crystal structure of the layers.

Residual Stress

The residual stresses were measured by XRD using the $\sin^2\Psi$ method (c.f. M. E. Fitzpatrick, A. T. Fry, P. Holdway, F. A. Kandil, J. Shackleton and L. Suominen—A Measurement Good Practice Guide No. 52; "Determination of Residual Stresses by X-ray Diffraction—Issue 2", 2005).

The side-inclination method (Ψ-geometry) has been used with eight Ψ-angles, equidistant within a selected $\sin^2\Psi$ range. An equidistant distribution of Φ-angles wihin a Φ-sector of 90° is preferred. The measurement was performed on a rake side of the tool, i.e. using an as flat surface as possible. For the calculations of the residual stress values, the Poisson's ratio=0.20 and the Young's modulus E=450 GPa have been applied. For measurements on a (Ti,Al)N layer the data were evaluated using commercially available software (RayfleX Version 2.503) locating the the (1 1 1) reflection of (Ti,Al)N by the Pseudo-Voigt-Fit function. Depending on the diffraction pattern also other reflections are possible, such as the (2 0 0) reflection, provided there is a sufficient signal strength.

For measurements on a cemented carbide substrate the data were evaluated using commercially available software (RayfleX Version 2.503) locating the (2 1 1) reflection of WC by the Pseudo-Voigt-Fit function. The coating is generally not needed to be removed.

For measurements of residual stress of a layer of a coating having further deposited layers above itself coating material is removed above the layer to be measured. This is also the case for measurements on a cemented carbide substrate haing a coating deposited. Care has to be taken to select and apply a method for the removal of material which does not significantly alter the residual stress within the remaining (Ti,Al)N multilayer material. A suitable method for the removal of deposited coating material may be polishing, however, gentle and slow polishing using a fine-grained polishing agent should be applied. Strong polishing using a coarse grained polishing agent will rather increase the compressive residual stress, as it is known in the art. Other suitable methods for the removal of deposited coating material are ion etching and laser ablation.

Hardness/Young's Modulus

The measurements of the hardness and the Young's modulus (reduced Young's modulus) were performed by the nanoindentation method on a Fischerscope® HM500 Picodentor (Helmut Fischer GmbH, Sindelfingen, Germany) applying the Oliver and Pharr evaluation algorithm, wherein a diamond test body according to Vickers was pressed into the layer and the force-path curve was recorded during the measurement (maximum load: 15 mN; load/unload time: 20 s; creep time: 5 s). From this curve hardness and (reduced) Young's modulus were calculated.

The measurement is usually made from the top of a layer perpendicular to the surface plane. However, for a multilayered structure one can make a cross sectional cut and measure the hardness in a direction along the surface plane. Furthermore, for thin layers an angled polish can be made so that a beveled surface is provided onto which the hardness can be measured.

DETAILED DESCRIPTION OF EMBODIMENTS IN DRAWINGS

Figure 1:
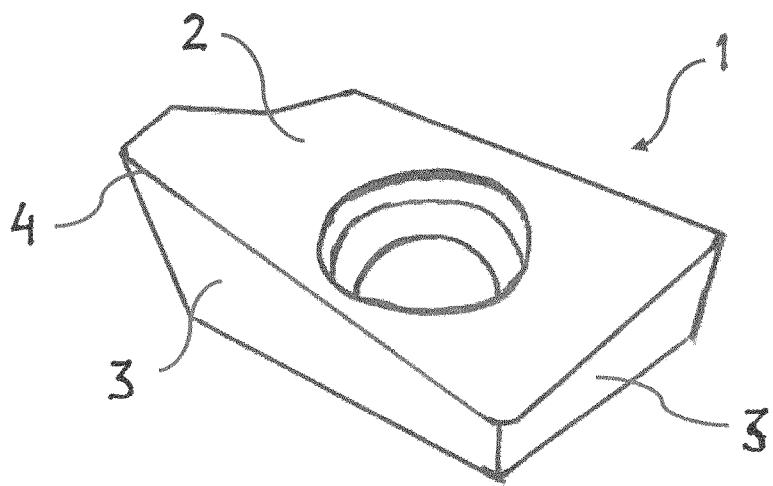
FIG. 1 shows a schematic view of one embodiment of a cutting tool being a milling insert.
Figure 2:
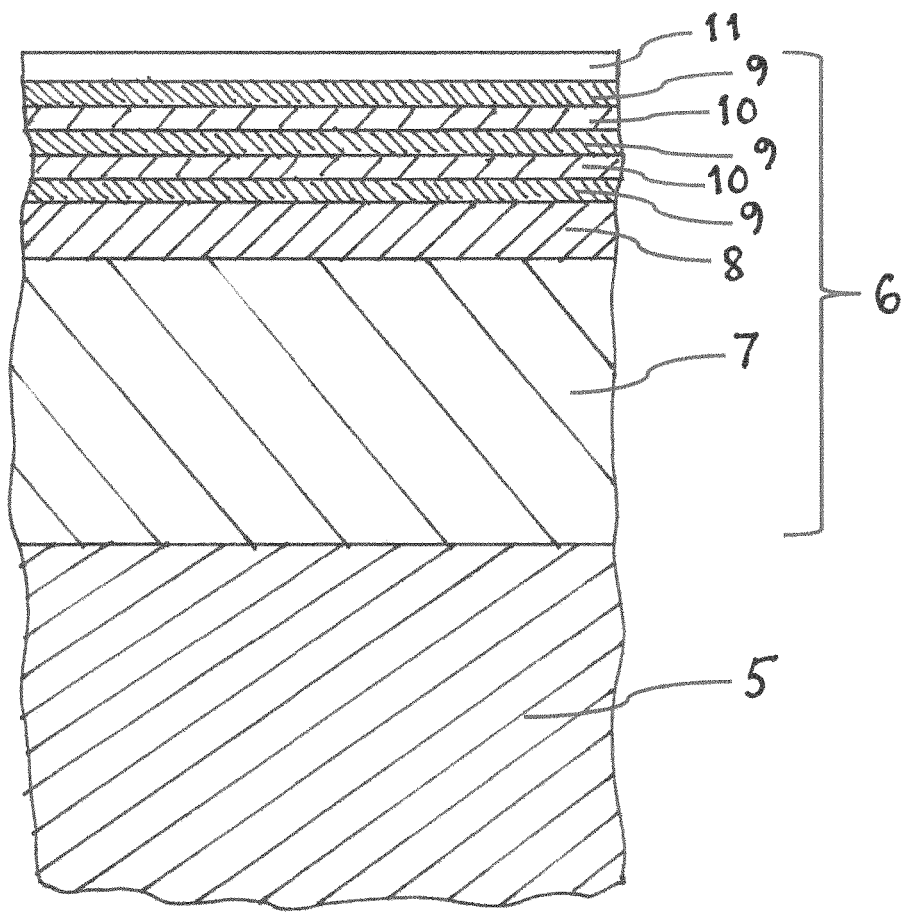
FIG. 2 shows a schematic view of a cross section of an embodiment of the coated cutting tool of the present invention showing a substrate and a coating comprising different layers.

FIG. 1 shows a schematic view of one embodiment of a cutting tool (1) having a rake face (2) and flank faces (3) and a cutting edge (4). The cutting tool (1) is in this embodiment a milling insert. FIG. 2 shows a schematic view of a cross section of an embodiment of the coated cutting tool of the present invention having a substrate body (5) and a coating (6). The coating consisting of a first (Ti,Al)N multilayer (7), a first gamma aluminium oxide layer (8), a set of alternating second (Ti,Al)N multilayers (9) and second gamma aluminium oxide layers (10) and an outermost layer (11) being a ZrN layer.

EXAMPLES

Example 1: Manufacturing of Samples According to the Invention

As a substrate was used cutting tool bodies (called "blanks") being insert having a geometry ADMT160608R-F56, ODHT050408-F57 and P2808.1 which are all geometries used in milling operations.

For samples S1 to S4, the cutting tool body was made out of a cemented carbide of the composition 88 wt % WC, 1.5 wt % (Ta, Nb)C and a binder phase of 10.5 wt % Co. The average WC grain size dWC was 0.8 μm.

For samples S5 and S6, the cutting tool body was made out of a cemented carbide of the composition 87.5 wt % WC, 0.5 wt % Cr and a binder phase of 12.5 wt % Co. The average WC grain size dWC was 0.4 μm.

Prior to the deposition, the substrate bodies were pre-treated by ultrasonic cleaning in a water-based medium.

The PVD reactor was evacuated to $8 \times 10^{-5}$ mbar, and the substrate was pre-treated at 550° C. The pre-treatment included an Ar ion etching procedure conducted removing about 0.8 μm thickness of the substrate so that all carbide grains that had been damaged (cracked) during earlier treatments of the blank, such as edge rounding, were removed.

The coating equipment used for depositing the coating according to the invention was a Hauzer HTC1000 (IHI Hauzer Techno Coating B.V., The Netherlands) with a chamber size of 1 $m^3$.

Deposition of the First (Ti,Al)N Multilayer

In the deposition of the first (Ti,Al)N multilayer cathodic arc evaporation was used. In the Hauzer HTC1000 equipment used a circular Arc-PVD technology (CARC+) using constant magnetic field configuration was applied during deposition.

For the deposition of the first (Ti,Al)N multilayer, two types of TiAl-targets with different atomic ratios Ti:Al were used to produce alternating (Ti,Al)N sub-layers. The Ti:Al atomic ratios in the two types of TiAl-targets, respectively, were "Ti50Al50" (Ti:Al=50:50) and "Ti33Al67" (Ti:Al=33:67).

If reference is herein made to a target of a particular composition, this means that, due to the layout of the used PVD reactor, a line of four targets of the same composition were vertically arranged to allow for a homogeneous deposition throughout the height of the reactor.

The targets had a diameter of 100 mm. The reactive gas for the nitride deposition was $N_2$. Two types of (Ti,Al)N sub-layer stacks, L1 and L2, were produced. To produce the inventive coating, L1 was deposited immediately on the substrate surface, and L2 was deposited immediately on top of L1. However, to investigate the (Ti,Al)N sub-layer stacks L1 and L2 independent from each other, samples wherein only L1 was deposited immediately on the substrate surface and samples wherein only L2 was deposited immediately on the substrate surface were produced. For the deposition of L1, two targets were used: 1× "Ti50Al50"+1× "Ti33Al67". To achieve a lower Ti content and a higher Al content in L2, for the deposition of L2 three targets were used: 1× "Ti50Al50"+2× "Ti33Al67". The depositions were carried out at an arc current at each target of about 150 A. Different samples were made using different bias levels, −40 V and −60 V, respectively, for L1 and −40 V and −50 V, respectively, for L2. The further process parameters for the deposition of different layers are given in table 1.

TABLE 1

| | | |
|---|---|---|
| (Ti, Al)N sub-layer stack L1 | Targets | "Ti50Al50" + "Ti33Al67" |
| | Bias | −40 V and −60 V |
| | Pressure ($N_2$) | 10 Pa |
| | Arc Current/Target | 150 A |
| | Rotation Speed | 3 rpm |
| | Temperature | 550° C. |
| (Ti, Al)N sub-layer stack L2 | Targets | "Ti33Al67" + "Ti50Al50" + "Ti33Al67" |
| | Bias | −40 V and −50 V |
| | Arc Current/Target | 150 A |
| | Pressure | 10 Pa |
| | Rotation | 3 rpm |
| | Temperature | 550° C. |

The thicknesses of the sub-layer stacks L1 and L2 for the samples made by using a bias level of −40 V were about 2

μm each, measured at the edge (at the beginning of the edge rounding) on both the rake face and the flank face and calculating an average.

The thicknesses of the sub-layer stacks L1 and L2 for the samples made by using a bias level of −60 V (L1) and −50 V (L2) were about 1.5 μm each, measured at the edge (at the beginning of the edge rounding) on both the rake face and the flank face and calculating an average. Table 2 summarises the samples made.

TABLE 2

| Sample | Insert geometry | Substrate | Bias | L1 | L2 |
|---|---|---|---|---|---|
| S1 | ADMT160608R-F56 | 1 | −40 V | 2 μm | 2 μm |
| S2 | ADMT160608R-F56 | 1 | −60 V | 1.5 μm | 1.5 μm |
| S3 | ODHT050408-F57 | 1 | −40 V | 2 μm | 2 μm |
| S4 | ODHT050408-F57 | 1 | −60 V | 1.5 μm | 1.5 μm |
| S5 | P2808.1 | 2 | −40 V | 2 μm | 2 μm |
| S6 | P2808.1 | 2 | −60 V | 1.5 μm | 1.5 μm |
| S1 | ADMT160608R-F56 | 1 | −40 V(L1) −40 V(L2) | 2 μm | 2 μm |
| S2 | ADMT160608R-F56 | 1 | −60 V(L1) −50 V(L2) | 1.5 μm | 1.5 μm |
| S3 | ODHT050408-F57 | 1 | −40 V(L1) −40 V(L2) | 2 μm | 2 μm |
| S4 | ODHT050408-F57 | 1 | −60 V(L1) −50 V(L2) | 1.5 μm | 1.5 μm |
| S5 | P2808.1 | 2 | −40 V(L1) −40 V(L2) | 2 μm | 2 μm |
| S6 | P2808.1 | 2 | −60 V(L1) −50 V(L2) | 1.5 μm | 1.5 μm |

The deposition time for L1 was 90 minutes when depositing using −40 V (samples S1, S3 and S5). Thus, L1 consisted of about 270 sub-layer periods, approximating an individual sub-layer thickness of about 4 nm.

When depositing L1 using −60 V (samples S2, S4 and S6) the deposition time for L1 was 63 minutes. Thus, L1 consisted of about 190 sub-layer periods, approximating an individual sub-layer thickness of about 4 nm.

The deposition time for L2 was 60 minutes when depositing using −40 V (samples S1, S3 and S5). Thus, L2 consisted of about 180 sub-layer periods, approximating an individual sub-layer thickness of about 4 nm for the sub-layer having an approximate composition $Ti_{0.50}Al_{0.50}N$ and an individual sub-layer thickness of about 8 nm for the sub-layer having an approximate composition $Ti_{0.33}Al_{0.67}N$.

When depositing L2 using −50 V (samples S2, S4 and S6) the deposition time for L2 was 42 minutes. Thus, L2 consisted of about 130 sub-layer periods, approximating an individual sub-layer thickness of about 4 nm for the sub-layer having an approximate composition $Ti_{0.50}Al_{0.50}N$ and an individual sub-layer thickness of about 8 nm for the sub-layer having an approximate composition $Ti_{0.33}Al_{0.67}N$.

Hardness and Young's Modulus of the First (Ti,Al)N Multilayer

The hardness and Young's modulus of the (Ti,Al)N sub-layer stacks L1 and L2 deposited in example 1 were measured by depositing L1 and L2 separately, respectively, immediately on a substrate and then perform the measurement. The thicknesses of the sub-layer stacks L1 and L2 were about 2 μm. The results are shown in table 3. As an alternative, it would also have been possible to measure the hardness and Young's modulus of L1 and L2, respectively, on a cross-sectional area of the first (Ti,Al)N multilayer, or measurement on an angled polished sample.

TABLE 3

| (Ti, Al)N sub-layer stack* | Vickers hardness [HV0.0015] | Reduced Young's modulus [GPa] |
|---|---|---|
| L1 | 3071 | 498 |
| L2 | 3035 | 483 |

*using −40 V bias voltage

Deposition of the First Gamma-aluminium Oxide Layer

All samples S1 to S6 were provided with a first gamma-aluminium oxide layer onto the first (Ti,Al)N layer.

The Hauzer HTC1000 PVD equipment is set to a mode for deposition by bipolar pulsed magnetron sputtering.

For the deposition of the aluminium oxide, two Al-targets (800 mm×200 mm×10 mm each) were used and a dual magnetron was applied. The bias power supply was used in a bipolar pulsed mode with 45 kHz and an off-time of 10 ms. The magnetron power supply was pulsed with 60 kHz (±2 kHz), and the pulse form was sinus shape. The cathode voltage at the stabilized stage of the process was 390 V. The deposition was carried out with three-fold rotated substrate. The essential deposition parameters and measurement results (measured on cutting tools to be coated positioned in the middle of the reactor height) are indicated in table 5.

TABLE 5

| Parameter | Value |
|---|---|
| Ar flow [sccm] | 1220 |
| O₂ flow [sccm] | 101 |
| Total pressure [mPa] | 1000 |
| O₂ part. press. [mPa] | 10.2 |
| Bias current [A] | 35.3 |
| Bias voltage [V] | −125 |
| Magnetron target power [kW] | 20 |
| Magnetron target power density [W/cm$^2$] | 6.2 |
| Coil current [A] | 4.5 |

0.6 μm of aluminium oxide was deposited onto the samples S1 to S6.

XRD measurements showed only gamma phase aluminium oxide peaks.

Hardness and Young's Modulus of the First Gamma-aluminium Oxide Layer

The hardness and Young's modulus of the first gamma-aluminium oxide layer was measured by further making a deposition of about 1 μm of the gamma-aluminium oxide separately onto a cemented carbide substrate, using the same deposition conditions as used for samples S1 to S6 and then perform the measurement. Table 6 shows the results. As an alternative, it would also have been possible to measure the hardness and Young's modulus on an angled polished sample or on a cross-sectional area of the first gamma-aluminium oxide layer.

TABLE 6

| Vickers Hardness [HV 0.0015] | 3100 |
|---|---|
| Reduced Young's modulus [GPa] | 380 |

Deposition of a Set of Alternating Second (Ti,Al)N Multilayers and Second Gamma-aluminium Oxide Layers The samples S1 to S6 were further deposited with a set of alternating second (Ti,Al)N multilayers and second gamma-aluminium oxide layers.

There are three second (Ti,Al)N multilayers and two second gamma-aluminium oxide layers deposited so the layer sequence is (Ti,Al)N—Al$_2$O$_3$—(Ti,Al)N—Al$_2$O$_3$—(Ti,Al)N.

The thickness of the first two of the second (Ti,Al)N multilayers and each of the two second gamma-aluminium oxide layers were about 0.1 µm. The third one of the second (Ti,Al)N multilayers was a little bit thicker, about 0.3 µm.

The second (Ti,Al)N multilayers are deposited in the same manner as when depositing the sub-layer stack L2 of the first (Ti,Al)N multilayer for each of samples S1 to S6, i.e., in the Hauzer HTC1000 equipment used a circular Arc-PVD technology (CARC+) using constant magnetic field configuration was applied during deposition. All other parameters and process conditions were the same as used for making the sub-layer stack L2 of the first (Ti,Al)N multi-layer. The bias used for making the second (Ti,Al)N multi-layers was −40 V.

For the deposition of the second (Ti,Al)N multilayers, as for depositing L2 of the first (Ti,Al)N multilayer, three targets were used: 1× "Ti50Al50"+2× "Ti33Al67". The process parameters are summarised in table 7.

TABLE 7

| second (Ti, Al)N multi-layer | Targets | "Ti33Al67" + "Ti50Al50" + "Ti33Al67" |
|---|---|---|
| | Bias | −40 V |
| | Arc Current/Target | 150 A |
| | Pressure | 10 Pa |
| | Rotation | 3 rpm |
| | Temperature | 550° C. |

The deposition time for each second (Ti,Al)N multilayer was about 200 s. Since the process conditions for making the second (Ti,Al)N multilayers are the same as for making the sub-layer stack L2 of the first (Ti,Al)N multilayer, a deposition time of 200 s can be estimated to give a layer thickness of a second (Ti,Al)N multilayer to be 0.11 µm. Since the number of sub-layer periods is about 10 for 200 s deposition, an individual sub-layer thickness is approximated to about 4 nm for the sub-layer having an approximate composition Ti$_{0.50}$Al$_{0.50}$N and an individual sub-layer thickness of about 8 nm for the sub-layer having an approximate composition Ti$_{0.33}$Al$_{0.67}$N.

The second gamma-aluminium oxide layers were deposited by bipolar pulsed magnetron sputtering using the same parameters and conditions as for depositing the first gamma-aluminium oxide layer.

Then, finally the samples an outer about 0.2 µm ZrN layer was deposited for colour and/or wear detection purposes. The deposition of ZrN was made by arc evaporation using an arc current of 150 A per target at 4 Pa nitrogen pressure using a bias voltage of −40 V.

Thus, the total thickness of the coating on samples S1, S3 and S5 was about 5.5 µm. Thus, the total thickness of the coating on samples S2, S4 and S6 was about 4.5 µm.

The layer structure provided is seen in table 8.

TABLE 8

| Layer # (from substrate) | Layer Thickness [µm] | Layers | (Ti, Al)N sublayer composition |
|---|---|---|---|
| 1 | 4 µm (S1, S3, S5) or 3 µm (S2, S4, S6) | first (Ti, Al)N multilayer | Ti$_{0.33}$Al$_{0.67}$N/Ti$_{0.50}$Al$_{0.50}$N (two different stacks L1 and L2) |
| 2 | 0.6 µm | first gamma-Al$_2$O$_3$ | — |
| 3 | 0.1 µm | second (Ti, Al)N multi-layer | Ti$_{0.33}$Al$_{0.67}$N/Ti$_{0.50}$Al$_{0.50}$N (as L2) |
| 4 | 0.1 µm | second gamma-Al$_2$O$_3$ | — |
| 5 | 0.1 µm | second (Ti, Al)N multi-layer | Ti$_{0.33}$Al$_{0.67}$N/Ti$_{0.50}$Al$_{0.50}$N (as L2) |
| 6 | 0.1 µm | second gamma-Al$_2$O$_3$ | — |
| 7 | 0.3 µm | second (Ti, Al)N multi-layer | Ti$_{0.33}$Al$_{0.67}$N/Ti$_{0.50}$Al$_{0.50}$N (as L2) |
| 8 | 0.2 µm | ZrN | — |

Thus, the total thickness of the coating on samples S1, S3 and S5 was about 5.5 µm and the total thickness of the coating on samples S2, S4 and S6 was about 4.5 µm.

The level of residual stress was determined on the cemented carbide substrate of sample S1 with the whole coating deposited but without any post-treatment made. The result was −149 MPa (i.e., 149 MPa residual compressive stress). A value of around −150 MPa is regarded to be typical for all samples S1 to S6.

The level of residual stress was also determined for the first (Ti,Al)N multilayer close to the substrate surface. Sample S1 was selected. The result was 154 MPa for the sample (i.e., 154 MPa residual tensile stress)

A further sample S7 was made having a much thinner coating deposited than any of samples S1 to S6. For this sample the bias voltage used during deposition of the first (Ti,Al)N multilayer was −60 V for L1 and −50 V for L2. For the second (Ti,Al)N multilayers −50 V was used (as for L2). This sample had a deposited coating having the same types of layers, and layer sequence, as present in the coating of samples S1 to S6 (see Table 8) but which were in most cases thinner. The total coating thickness was 3.7 µm. Table 9 shows the layer thicknesses. The level of residual stress was determined for the first (Ti,Al)N multilayer close to the substrate surface of this sample as well.

TABLE 9

| Layer # (from substrate) | Layer Thickness [µm] | Layers | (Ti, Al)N sublayer composition |
|---|---|---|---|
| 1 | 2 µm | first (Ti, Al)N multilayer | Ti$_{0.33}$Al$_{0.67}$N/Ti$_{0.50}$Al$_{0.50}$N (two different stacks L1 and L2) |
| 2 | 0.5 µm | first gamma-Al$_2$O$_3$ | — |
| 3 | 0.1 µm | second (Ti, Al)N multi-layer | Ti$_{0.33}$Al$_{0.67}$N/Ti$_{0.50}$Al$_{0.50}$N (as L2) |
| 4 | 0.1 µm | second gamma-Al$_2$O$_3$ | — |
| 5 | 0.1 µm | second (Ti, Al)N multi-layer | Ti$_{0.33}$Al$_{0.67}$N/Ti$_{0.50}$Al$_{0.50}$N (as L2) |
| 6 | 0.1 µm | second gamma-Al$_2$O$_3$ | — |
| 7 | 0.3 µm | second (Ti, Al)N multi-layer | Ti$_{0.33}$Al$_{0.67}$N/Ti$_{0.50}$Al$_{0.50}$N (as L2) |
| 8 | 0.5 µm | ZrN | — |

The level of residual stress was determined for the first (Ti,Al)N multilayer close to the substrate surface. The result was −1198 MPa for the sample (i.e., 1198 MPa residual compressive stress)

Post Treatment Operations

The samples S1 to S6, as well as sample S7 were post treated by shot peening followed by wet blasting. The wet blasting both smoothens the coating surface and imparts a level of average compressive stress in the coating.

Shot Peening Parameters

Blasting pressure 5 bar
Blasting Angle 90°, against the surface plane of the coating
Blasting Distance 10 cm
Blasting Material $ZrO_2$ beads (diameter 75-125 µm),
Blasting time 2 sec
The $ZrO_2$ beads used had the following composition:
$ZrO_2$: 60-65 wt %
$SiO_2$: 25-30 wt %
$Al_2O_3$: 2-5 wt %
the rest being other oxides ($CaO$, $Fe_2O_3$, $TiO_2$)
Unblasted substrate −80 MPa
Residual stress in substrate was −1120 MPa

Wet Blasting Parameters

Blasting pressure: 1.6 to 2 bar
Blasting Angle: 75°, against the surface plane of the coating
Blasting Distance: 10 cm
Blasting Material: $Al_2O_3$ F220 (FEPA)

The blasting was made using a set-up provided with 14 blasting guns, the set-up designed for blasting a tray of inserts of about 50-400 cutting tool inserts. A blasting of 40-50 seconds during rotation lead to an estimated blasting time per insert of one to three seconds.

The level of residual stress was determined on the cemented carbide substrate of sample S1 with the whole coating deposited and after both post-treatments shot peening and wet blasting. The result was −1133 MPa (i.e., 1133 MPa compressive stress).

The level of residual stress was also determined for the first (Ti,Al)N multilayer close to the substrate surface. Sample S1 and sample S7 were tested which had the whole coating deposited and had been subjected to both post-treatments shot peening and wet blasting. The result was −1258 MPa for sample S1 (i.e., 1258 MPa residual compressive stress) and −1225 MPa for sample S7 (i.e., 1225 MPa residual compressive stress). Thus, the same stress levels were reached for both samples.

Table 10 summarises the results from all residual stress measurements.

TABLE 10

| Sample | Residual stress, substrate surface [MPa] | Residual stress, lowest part of first (Ti, Al)N multilayer [MPa] |
| --- | --- | --- |
| S1 with coating, as deposited | −149 | +154 |
| S1 with coating, after post treatments | −1133 | −1258 |
| S7 with coating, as deposited | — | −1198 |
| S7 with coating, after post treatments | — | −1225 |

The post treatment process increases the residual compressive stress (for the thicker coating) in the lowest part of the coating to a level of about 1 GPa. The surface of the substrate at the same time has a residual stress level after the post treatment process at the same level.

Example 2: Manufacturing of Comparative Samples

A comparative coated cutting tool samples S8 to S10, essentially according to prior art U.S. Pat. No. 8,709,583, were made by depositing a coating onto a cutting tool body being an insert having a geometry ADMT160608R-F56 (for sample S8), ODHT050408-F57 (for sample S9) and P2808.1 (for sample S10), respectively. The cutting tool body was for samples S8 and S9 made out of a cemented carbide of the composition 88 wt % WC, 1.5 wt % (Ta, Nb)C and a binder phase of 10.5 wt % Co. The average WC grain size dWC was 0.8 µm. For sample S10 the cutting tool body was a cemented carbide of the composition 87.5 wt % WC, 0.5 wt % Cr and a binder phase of 12.5 wt % Co. The average WC grain size dWC was 0.4 µm.

The coating was deposited by using a PVD coating installation Hauzer HTC1000. The coating was made out of a 7-layer coating:
1. (Ti,Al)N (ratio Ti:Al of 33:67 atomic %) of a layer thickness of 2 µm deposited by arc evaporation,
2. aluminium oxide of a layer thickness of 0.5 µm deposited by reactive magnetron sputtering,
3. (Ti,Al)N (ratio Ti:Al of 33:67 atomic %) of a layer thickness of 0.2 µm deposited by arc evaporation,
4. aluminium oxide of a layer thickness of 0.15 µm deposited by reactive magnetron sputtering,
5. (Ti,Al)N (ratio Ti:Al of 33:67 atomic %) of a layer thickness of 0.2 µm deposited by arc evaporation,
6. aluminium oxide of a layer thickness of 0.15 µm deposited by reactive magnetron sputtering,
7. ZrN of a layer thickness of 0.6 µm deposited by arc evaporation, Before the coating operation the substrate was cleaned in alcohol and additionally cleaned by using an Ar ion bombardment prior to deposition of the layers in the vacuum chamber. The Ar ion bombardent was, however, only proceeded that only up to about 0.2 µm of the substrate material was removed.

Deposition of the Layers:
1st, 3rd and 5th Layers:
Deposition of (Ti,Al)N was effected by arc evaporation with a 65 A vaporiser current per source at 3 Pa nitrogen and with a bias voltage in the DC mode of −40 V and at a temperature of about 550° C.

2nd, 4th and 6th Layers:
Deposition of aluminium oxide was effected by reactive magnetron sputtering with a specific cathode power of about 7 $W/cm^2$ at 0.5 Pa Ar and oxygen as the reactive gas (flow about 80 sscm), with a bipolarly pulsed bias voltage (70 kHz) of −150 V and a temperature of about 550° C.

7th Layer:
ZrN was deposited in an arc with a 150 A vaporiser current per source at 4 Pa nitrogen and a bias voltage in the DC mode of −40 V and a temperature of about 550° C.

Table 11 summarises the layer sequence in comparative samples S8 to S10.

TABLE 11

| Layer # (from substrate) | Layer Thickness [µm] | Layers |
| --- | --- | --- |
| 1 | 2 µm | $Ti_{0.33}Al_{0.67}N$, single layer |
| 2 | 0.5 µm | gamma-$Al_2O_3$ |

TABLE 11-continued

| Layer # (from substrate) | Layer Thickness [μm] | Layers |
|---|---|---|
| 3 | 0.2 μm | $Ti_{0.33}Al_{0.67}N$, single layer |
| 4 | 0.15 μm | gamma-$Al_2O_3$ |
| 5 | 0.2 μm | $Ti_{0.33}Al_{0.67}N$, single layer |
| 6 | 0.15 μm | gamma-$Al_2O_3$ |
| 7 | 0.6 μm | ZrN |

It was tested to perform the shot peening post treatment as made for the inventive samples in Example 1 also to the comparative samples. However, the coating flaked off.

Example 3—Cutting Tests

The performance of the coated cutting tools samples S1 to S6 according to the invention was tested in milling operation along with the comparative samples S8 to S10. See table 12 summarising the samples.

TABLE 12

| Sample | Insert geometry | Substrate | Coating |
|---|---|---|---|
| S1 | ADMT160608R-F56 | 1 | invention |
| S2 | ADMT160608R-F56 | 1 | invention |
| S3 | ODHT050408-F57 | 1 | invention |
| S4 | ODHT050408-F57 | 1 | invention |
| S5 | P2808.1 | 2 | invention |
| S6 | P2808.1 | 2 | invention |
| S8 | ADMT160608R-F56 | 1 | comparative |
| S9 | ODHT050408-F57 | 1 | comparative |
| S10 | P2808.1 | 2 | comparative |

Samples S1 and S2 were compared against comparative sample S8.

Samples S3 and S4 were compared against comparative sample S9.

Samples S5 and S6 were compared against comparative sample S10.

Test 1

The metal cutting performance of the coated cutting tool samples S1, S2 and S8 were tested in face milling operations using a face milling cutter type F2010.UB.127.Z08.02R681M (according to DIN4000-88) from Walter AG, Tübingen, Germany, on a Heller FH 120-2 machine under the following conditions.

Cutting Conditions

Tooth Feed $f_z$ [mm/tooth]: 0.2

Cutting speed $v_c$ [m/min]: 283

Axial cutting depth $a_p$ [mm]: 98

Radial cutting depth $a_e$ [mm]: 3

Workpiece material: 42CrMo4; tensile strength Rm: 740 N/mm$^2$

The cut-off criteria was the maximum wear at the flank faces of the tool, i.e., the deepest crater observed on the flank face of a tool, $V_{Bmax}$, reaching 0.3 mm.

Table 13 shows the results of the cutting tests.

TABLE 13

| Sample ID | Cutting length [mm] |
|---|---|
| S1 | 7200 |
| S2 | 6400 |
| S8 | 5600 |

Test 2

The metal cutting performance of the coated cutting tool samples S3, S4 and S9 were tested in face milling operations using a face milling cutter type F4081.B.052.Z05.04 (according to DIN4000-88) from Walter AG, Tübingen, Germany, on a Heller FH 120-2 machine under the following conditions.

Cutting Conditions

Tooth Feed $f_z$ [mm/tooth]: 0.23

Cutting speed $v_c$ [m/min]: 240

Axial cutting depth $a_p$ [mm]: 3

Radial cutting depth $a_e$ [mm]: 40

Workpiece material: 1.4435 (X2CrNiMo18-14-3); tensile strength Rm: 515 N/mm$^2$

The cut-off criteria was the maximum wear at the flank faces of the tool, i.e., the deepest crater observed on the flank face of a tool, $V_{Bmax}$, reaching 0.3 mm.

Table 14 shows the results of the cutting tests.

TABLE 14

| Sample ID | Cutting length [mm] |
|---|---|
| S3 | 15000 |
| S4 | 14000 |
| S9 | 10000 |

Test 3

The metal cutting performance of the coated cutting tool samples S5, S6 and S10 were tested in face milling operations using a face milling cutter type F2010.UB.127.Z08.02R681M (according to DIN4000-88) from Walter AG, Tübingen, Germany, on a Heller FH 120-2 machine under the following conditions.

Cutting Conditions

Tooth Feed $f_z$ [mm/tooth]: 0.2

Cutting speed $v_c$ [m/min]: 150

Axial cutting depth $a_p$ [mm]: 3

Radial cutting depth $a_e$ [mm]: 50

Workpiece material: 1.4301 (X5CrNi18-10)

The cut-off criteria was the maximum wear at the flank faces of the tool, i.e., the deepest crater observed on the flank face of a tool, $V_{Bmax}$, reaching 0.3 mm.

Table 15 shows the results of the cutting tests.

TABLE 15

| Sample ID | Cutting length [mm] |
|---|---|
| S5 | 4800 |
| S6 | 4800 |
| S10 | 3200 |

The invention claimed is:

1. A coated cutting tool consisting of:
a substrate body having a surface; and
a coating, the substrate body being a WC—Co based cemented carbide body 5-15 wt % Co, and the coating comprising, in the order from the substrate body surface:
a first (Ti,Al)N multilayer consisting of a multilayer of individual alternating (Ti,Al)N sub-layers, wherein an overall atomic ratio of Ti:Al within the first (Ti,Al)N multilayer is from 33:67 to 67:33, wherein a total thickness of the first (Ti,Al)N multilayer is from 1 to 8 μm, wherein each of the individual (Ti,Al)N sub-layers within the first (Ti,Al)N multilayer has a thickness of from 1 to 25 nm, wherein each of the individual (Ti,Al)N sub-layers within the first (Ti,Al)N multilayer being different in respect of the atomic ratio Ti:Al than an immediately adjacent (Ti,Al)N sub-layer, and wherein the first (Ti,Al)N multilayer consists of two or more (Ti,Al)N sub-layer stacks arranged immediately on top of each other, wherein within the same (Ti,Al)N sub-layer stack there exists at least two types of individual (Ti,Al)N sub-layers, wherein the at least two types of individual (Ti,Al)N sub-layers have different Ti:Al atomic ratios, and wherein the overall Al content within each of the (Ti,Al)N sub-layer stacks increases from one (Ti,Al)N sub-layer stack to the next (Ti,Al)N sub-layer stack in the direction towards the outer surface of the coating;
a first gamma-aluminium oxide layer, wherein a thickness of the first gamma-aluminium oxide layer is from 0.3 to 1.5 μm; and
a set of alternating second (Ti,Al)N multilayers and second gamma-aluminium oxide layers, wherein a number of each of the alternating second (Ti,Al)N multilayers and second gamma-aluminium oxide layers is ≥2, each of the second (Ti,Al)N multilayers being a multilayer of alternating (Ti,Al)N sub-layers, wherein an overall atomic ratio of Ti:Al within the second (Ti,Al)N multilayers is within the range from 33:67 to 67:33, wherein a thickness of each of the second (Ti,Al)N multilayers is from 0.05 to 0.5 μm, wherein each of the individual (Ti,Al)N sub-layers within the second (Ti,Al)N multilayers has a thickness within the range from 1 to 25 nm, each of the individual (Ti,Al)N sub-layers within the second (Ti,Al)N multilayers being different in respect of the atomic ratio Ti:Al than an immediately adjacent (Ti,Al)N sub-layer, wherein a thickness of each of the second gamma-aluminium oxide layers is from 0.05 to 0.5 μm, and wherein a total thickness of the coating of the coated cutting tool is from 3 to 15 μm.

2. The coated cutting tool according to claim 1, wherein a surface zone of the substrate body exhibits a residual compressive stress of at least 0.5 GPa.

3. The coated cutting tool according to claim 1, wherein the atomic ratio Ti:Al of the type of individual (Ti,Al)N sub-layers of the first (Ti,Al)N multilayer having a highest Al content of the types of individual (Ti,Al)N sub-layers is suitably within the range from 20:80 to 60:40.

4. The coated cutting tool according to claim 1, wherein the atomic ratio Ti:Al of the type of individual (Ti,Al)N sub-layers of the first (Ti,Al)N multilayer having a lowest Al content of the types of individual (Ti,Al)N sub-layers is suitably within the range from 35:65 to 80:20.

5. The coated cutting tool according to claim 1, wherein the thickness of each (Ti,Al)N sub-layer stack of the first (Ti,Al)N multilayer is from 0.5 to 5 μm.

6. The coated cutting tool according to claim 1, wherein the first (Ti,Al)N multilayer consists of two to five (Ti,Al)N sub-layer stacks arranged immediately on top of each other.

7. The coated cutting tool according to claim 1, wherein the first (Ti,Al)N multilayer has a Vickers hardness HV0.0015 ≥2800 and/or a reduced Young's modulus >350 GPa.

8. The coated cutting tool according to claim 1, wherein there is a residual compressive stress present within a portion of a thickness of at least 100 nm to at most 1 μm within the first (Ti,Al)N multilayer from an interface of the (Ti,Al)N multilayer arranged in a direction towards the substrate body, the residual compressive stress being from 0.5 to 2 GPa.

9. The coated cutting tool according to claim 1, wherein the Vickers hardness HV(0.0015) of the gamma-aluminium oxide layer is from 3000 to 3500 HV0.0015 and the reduced Young's modulus of the gamma-aluminium oxide layer is from 350 to 390 GPa.

10. The coated cutting tool according to claim 1, wherein the coating includes an outermost layer of a metal nitride layer, the metal belonging to group 4, 5, or 6, of the periodic table of elements.

11. The coated cutting tool according to claim 10, wherein the metal is Zr, Ti or Cr.

12. The coated cutting tool according to claim 1, wherein the cutting tool is a cutting insert for milling, a cutting insert for turning, a cutting insert for drilling, a drill or an endmill.

13. The coated cutting tool according to claim 1, wherein an increase in an overall Al content within each of the (Ti,Al)N sub-layer stacks from one (Ti,Al)N sub-layer stack to a next (Ti,Al)N sub-layer stack in a direction towards the outer surface of the coating of the first (Ti,Al)N multilayer includes an atomic ratio Ti:Al over several pairs of adjacent (Ti,Al)N sub-layers that remains constant over several pairs of adjacent (Ti,Al)N sub-layers of one sub-layer stack and then the atomic ratio Ti:Al is lowered by an amount in the next several pairs of adjacent (Ti,Al)N sub-layers of a further sub-layer stack.

14. A process for the production of a coated cutting tool consisting of a substrate body and a deposited coating, comprising the steps of:
providing a substrate body, the substrate body being a WC—Co based cemented carbide body including from 5 to 15 wt % Co;
subjecting a surface of the substrate body to a pre-treatment, the pre-treatment being an ion etching procedure, so that at least a 0.5 μm thickness of the substrate body is removed;
depositing a 1 to 8 μm thick layer of a first TiAlN multilayer by a cathodic arc evaporation PVD process using at least two TiAl targets different in a Ti:Al atomic ratio in a chamber including nitrogen gas at a pressure of from 5 to 15 Pa, using a bias voltage of from −20 to −80 V, and at an applied arc current of from 50 to 200 A, the (Ti,Al)N multilayer consisting of a multilayer of alternating (Ti,Al)N sub-layers, wherein the atomic Ti:Al ratio of the at least two TiAl targets is chosen so that an overall atomic ratio of Ti:Al is from 33:67 to 67:33, wherein each of the individual (Ti,Al)N sub-layers has a thickness within the range from 1 to 25 nm, each of the individual (Ti,Al)N sub-layers being different in respect of the atomic ratio Ti:Al than an immediately adjacent (Ti,Al)N sub-layer, wherein the (Ti,Al)N multilayer is deposited in a manner so that it consists of two or more (Ti,Al)N sub-layer stacks arranged immediately on top of each other, wherein within the same (Ti,Al)N sub-layer stack there exists at least two types of individual (Ti,Al)N sub-layers, wherein the at least two types of individual (Ti,Al)N sub-layers have different Ti:Al atomic ratios, and wherein the overall Al content within each of the (Ti,Al)N sub-layer stacks increases from one (Ti,Al)N sub-layer stack to the next (Ti,Al)N sub-layer stack in the direction towards the outer surface of the first (Ti,Al)N multilayer;

depositing a 0.3 to 1.5 μm thick layer of a first gamma-aluminium oxide layer by a reactive magnetron sputtering PVD process using at least one Al target in an oxygen containing gas volume at a total gas pressure of from 1 to 5 Pa, an oxygen partial pressure of from 0.001 to 0.1 Pa, at a temperature of from 400 to 600° C., using a power density at the magnetron of from 4 to 20 W/cm$^2$, a bias voltage of from 80 to 200 V and a pulsed bias current of from 20 to 60 A;

depositing a set of alternating layers of second (Ti,Al)N multilayers and second gamma-aluminium oxide layers, the second (Ti,Al)N multilayers and the second gamma-aluminium oxide layers are deposited using the same process conditions as when depositing the first (Ti,Al)N multilayer and the first gamma-aluminium oxide layer, respectively, wherein the number of each of second (Ti,Al)N multilayers and second gamma-aluminium oxide layers is ≥2, each of the second (Ti,Al)N multilayers being a multilayer of alternating (Ti,Al)N sub-layers, the overall atomic ratio of Ti:Al within the second (Ti,Al)N multilayers is from 33:67 to 67:33, the thickness of the second (Ti,Al)N multilayers is from 0.05 to 0.5 μm, each of the individual (Ti,Al)N sub-layers within the second (Ti,Al)N multilayers has a thickness of from 1 to 25 nm, each of the individual (Ti,Al)N sub-layers within the second (Ti,Al)N multilayers being different in respect of the atomic ratio Ti:Al than an immediately adjacent (Ti,Al)N sub-layer, the thickness of the second gamma-aluminium oxide layers is from 0.05 to 0.5 μm, wherein a total thickness of the deposited coating of the coated cutting tool is from 3 to 15 μm;

subjecting the deposited coating to a first post-treatment procedure including shot peening using beads of a zirconium oxide based ceramic so that a compressive stress of at least 0.5 GPa is induced in the surface zone of the substrate body; and subjecting the deposited coating to a second post-treatment procedure by wet blasting with a slurry of aluminium oxide particles.

15. The process according to claim 14, wherein an outermost layer is deposited after the depositing of the set of alternating layers of second (Ti,Al)N multilayers and second gamma-aluminium oxide layers, but prior to the first post-treatment procedure, the outermost layer being a metal nitride layer, the metal belonging to group 4, 5, or 6, of the periodic table of elements.

16. The process according to claim 15, wherein the metal is Zr, Ti or Cr.

17. The process according to claim 14, wherein the beads used in the shot peening are within a size ranging from 70 to 125 μm, the shot peening is performed using a blasting pressure of from 3 to 6 bar, a working time in the shot peening is from 2 to 10 seconds, a distance between the blasting nozzle and the surface of the coated cutting tool is from 75 to 150 mm, and the shot peening is performed in a shot direction substantially perpendicular to the surface of the coated cutting tool.

18. The process according to claim 14, wherein the second post-treatment procedure includes wet blasting using a blasting pressure of from 1.5 to 2 bar, a concentration of aluminium oxide particles in a slurry is from 15 to 20 vol-%, the aluminium oxide particles used in the wet blasting belong to one or more of FEPA designations F240, F280 and F320, a blasting time in the wet blasting is from 2 to 60 seconds, a distance between a blasting gun nozzle and the surface of the coated cutting tool is from 50 to 200 mm, and the wet blasting is performed in a blasting direction having an angle to the surface of the coated cutting tool being from 60 to 90°.

19. The process according to claim 18, wherein the wet blasting is done until a residual compressive stress of at least 0.2 GPa, as averaged over the thickness of the coating, is induced within the coating.

* * * * *